(12) United States Patent
Sakon et al.

(10) Patent No.: US 7,406,893 B2
(45) Date of Patent: Aug. 5, 2008

(54) CLEARANCE-FREE SUPPORTING STRUCTURE FOR PIVOTAL AXLE APPLICABLE TO SHIFT LOCK UNIT OF MULTI-STAGE AUTOMATIC TRANSMISSION

(75) Inventors: Hiroshi Sakon, Battle Creek, MI (US); Norihito Shioji, Shizuoka (JP)

(73) Assignee: Fuji Kiko Co., Ltd., Kosai-shi (JP)

( * ) Notice: Subject to any disclaimer, the term of this patent is extended or adjusted under 35 U.S.C. 154(b) by 844 days.

(21) Appl. No.: 10/964,820

(22) Filed: Oct. 15, 2004

(65) Prior Publication Data

US 2005/0092120 A1 May 5, 2005

(30) Foreign Application Priority Data

Oct. 17, 2003 (JP) ............................. 2003-357500

(51) Int. Cl.
*G05G 5/00* (2006.01)
(52) U.S. Cl. .................. 74/473.22; 74/473.21
(58) Field of Classification Search .............. 74/473.21, 74/473.22, 473.23, 473.28, 473.3, 473.33; 403/111, 146, 149
See application file for complete search history.

(56) References Cited

U.S. PATENT DOCUMENTS 5,697,254 A 12/1997 Kubosaki
2003/0074999 A1 4/2003 Shioji et al

FOREIGN PATENT DOCUMENTS

JP 9-58290 A 3/1997
JP 2003-127691 A 5/2003

*Primary Examiner*—Richard Ridley
*Assistant Examiner*—Terence Boes
(74) *Attorney, Agent, or Firm*—Foley & Lardner LLP

(57) ABSTRACT

In a clearance-free supporting structure for a pivotal axle applicable to an operation device of a multi-stage automatic transmission, at least one pair of first projections is formed on a housing between which the pivotal axle is inserted to enable a pivotal movement of the pivotal axle, a pair of left and right truncated cone shaped portions are formed on the pivotal axle, at least one pair of second projections is formed on the housing to graspably contact with the pair of left and right truncated cone shaped portions to enable the pivotal movement of the pivotal axle, at least one recessed portion formed on the housing at a position placed in proximity to a base portion of each of the pair of first projections to enable a slidable contact thereof with the pivotal axle, and a biasing device biases the pivotal axle to be pressed toward the recessed portion.

12 Claims, 7 Drawing Sheets

CLEARANCE-FREE SUPPORTING STRUCTURE FOR PIVOTAL AXLE APPLICABLE TO SHIFT LOCK UNIT OF MULTI-STAGE AUTOMATIC TRANSMISSION

BACKGROUND OF THE INVENTION

1. Field of the Invention

The present invention relates to a clearance-free supporting structure for a pivotal axle (portion), for example, the clearance-free supporting structure of the pivotal axle (portion) disposed within a shift lock mechanism (or a shift lock unit) in an operation device of a multi-stage automatic transmission to be mounted in an automotive vehicle.

2. Description of the Related Art

A Japanese Patent Application First Publication No. 2003-127691 published on May 8, 2003 (which corresponds to a United States Patent Application Publication No. US 2003/0074999 A1 published on Apr. 24, 2003) exemplifies a previously proposed shift lock mechanism for a multi-stage automatic transmission. In the multi-stage automatic transmission disclosed in the above-described Japanese Patent Application First Publication, functions of a park lock at a P (Parking) position and an R (Reverse) inhibit at an N (Neutral) position are provided. In the above-described Japanese Patent Application First Publication, the shift lock mechanism which achieves both of the above-described functions is integrated into a single unit and fixed on an outer side surface of a frame of the multi-stage automatic transmission.

In details, a lock unit is fixed onto the outer side surface of the frame. The lock unit is provided with a lock lever which is brought in close contact with a stop (or stopper) lever attached to a select lever. Lock unit includes a base plate on which a plurality of engagement portions are engaged with a plurality of engagement holes opened to one of side surfaces of left and right (lateral) directions of the frame and to which the lock lever, a pivotal axle portion, and an actuator such as a solenoid to pivot the pivotal axle portion are operably attached. The lock lever and its pivotal axle portion are constructed as follows: The pivotal axle portion orthogonal to a vicinity to a pivotal axle base portion of a main body of the lock lever in an approximately sector shape and having a predetermined length are integrally formed of a synthetic resin. The pivotal axle portion is provided with a small-diameter axle portion fitted into an axle supporting portion formed on a base plate. This small-diameter axle portion can be fitted into a cut-out (notch) portion. The axle supporting portion other than the notch portion is an arc-shaped projection rotatably supporting the pivotal axle portion. One end portion of the pivotal axle portion is rotatably supported on an axle supporting portion constituted by an annular projection insertably formed on base plate. The other end portion of pivotable axle portion is integrally formed with a lower portion projected toward an oblique side direction and integrally formed with a lever portion projected in parallel to an axial center line of the pivotal axle portion and at a position having a predetermined length toward a radial direction from the axial center line. Hence, the pivotal axle portion is pivotable and can be moved toward the axial direction via the axle supporting portions. Hence, a clearance against a window hole of the frame with which lock lever is engaged can be absorbed. The lever portion is formed with an elongated hole. A pin projection installed on an operation portion of the actuator is engaged with the elongated hole. The pin projection is elongated so that a distance between the operation portion and lever portion is so long that the clearance between inner side surfaces of the window hole can be absorbed. A release lever is pivotally supported on the base plate by means of an axle and is biased by means of a spring so that its one end portion of the release lever and the projection are always spaced apart from each other. The other end portion of the release lever is brought in close contact with a lever end portion of a pin whose upper end portion is exposed to an indicator portion.

SUMMARY OF THE INVENTION

In the previously proposed shift lock mechanism disclosed in the above-described Japanese Patent Application First Publication, pivotal axle portion is pivotably supported on axle supporting portions. During the pivotal movement of the pivotal axle portion, the clearances among the pivotal axle portion and respective axle supporting portions are inevitably developed. These clearances generate an abnormal sound, A rubber damper or grease is used for each of the axle supporting portions to prevent the generation of the abnormal sound. However, due to an excessive application of the grease or low temperature hardening, an increase in a slide resistance occurs. Hence, an actuator having an absorbing (abstracting) force to overcome the increase in the slide resistance is needed. Hence, a long sizing of the shift lock unit and a rise in the manufacturing cost are brought about.

It is, therefore, an object of the present invention to provide a clearance-free supporting structure for a pivotal axle applicable to the pivotal axle portion of the shift lock unit (or shift lock mechanism) in a vehicular automatic transmission operation device which can solve the above-described inconveniences.

According to one aspect of the present invention, there is provided with a clearance-free supporting structure for a pivotal axle, comprising: a housing; at least one pair of first projections formed on the housing between which the pivotal axle is inserted to enable a pivotal movement of the pivotal axle; a pair of left and right truncated cone shaped portions formed on the pivotal axle; at least one pair of second projections formed on the housing to graspably contact with the pair of left and right truncated cone shaped portions to enable the pivotal movement of the pivotal axle; at least one recessed portion formed on the housing at a position placed in proximity to a base portion of each of the pair of first projections to enable a slidable contact thereof with the pivotal axle; and a biasing device to bias the pivotal axle to be pressed toward the recessed portion, the pair of first projections, the pair of left and right truncated cone shaped portions, the pair of second projections, the recessed portion, and the biasing device supporting the pivotal axle on the housing while limiting any directional movements of the pivotal axle other than the pivotal movement of the pivotal axle.

This summary of the invention does not necessarily describe all necessary features so that the invention may also be a sub-combination of these described features.

DETAILED DESCRIPTION OF THE PREFERRED EMBODIMENT

Reference will hereinafter be made to the drawings in order to facilitate a better understanding of the present invention.

Figure 1:
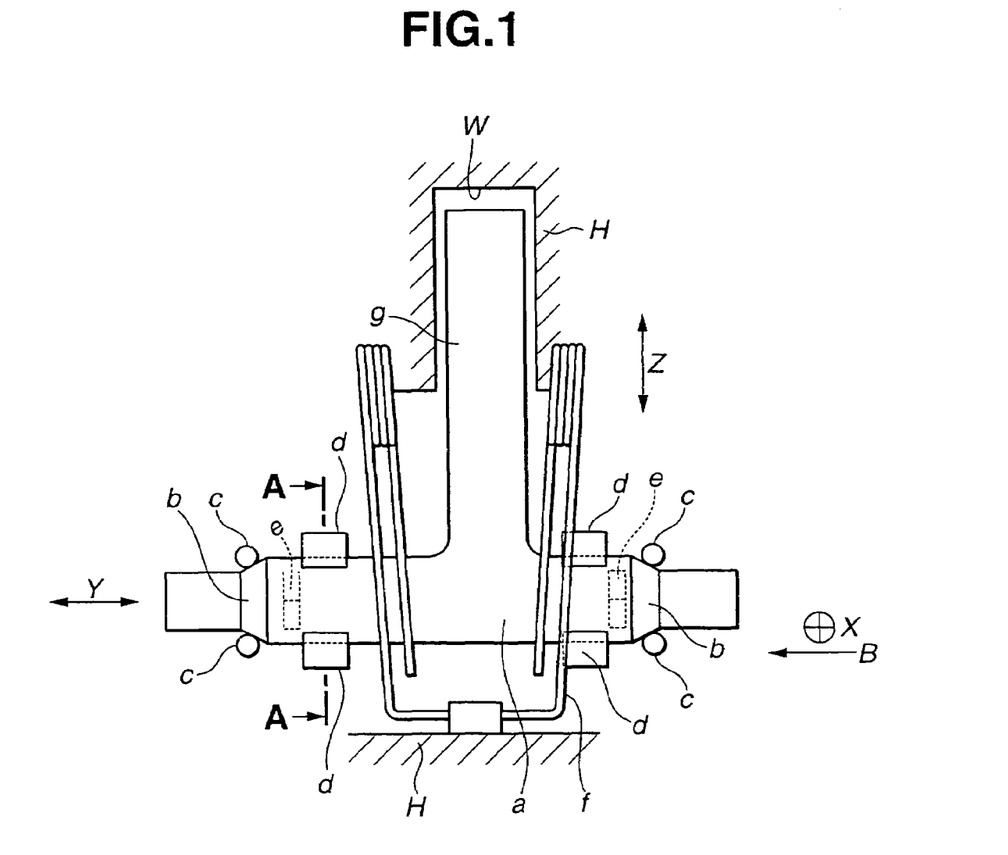
FIG. 1 is an elevation view for explaining a principle of a clearance-free structure for a pivotal axle according to the present invention.
Figure 2:
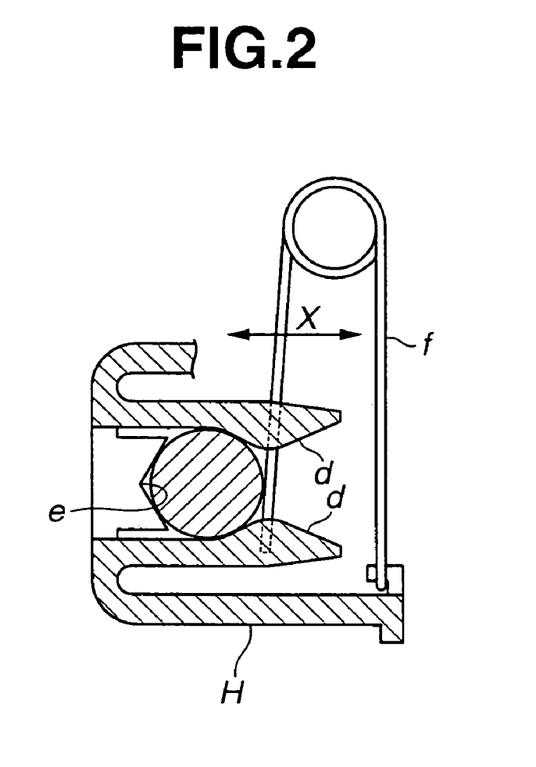
FIG. 2 is a cross sectional view cut away along a line A-A in FIG. 1.
Figure 3:
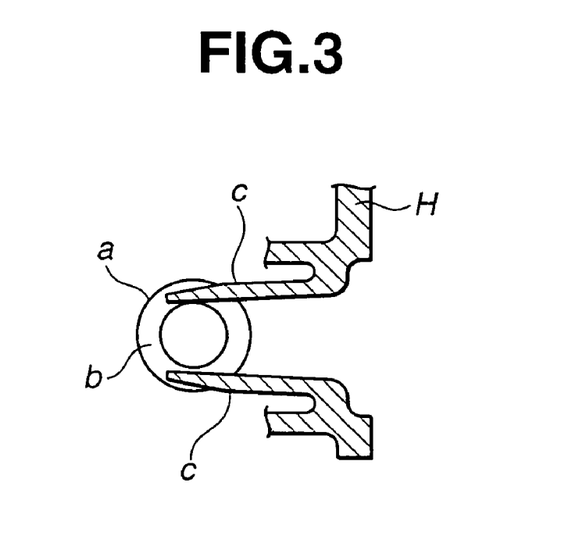
FIG. 3 is a side view of an essential part viewed from an arrow-marked direction of B in FIG. 1.

Before explaining a shift lock unit of a multi-stage automatic transmission to which the present invention is applicable, FIGS. 1 through 3 show a conceptual view representing a principle of structure according to the present invention. As shown in FIGS. 1 through 3, truncated cone shaped portions b, b have truncated portions faced toward outer directions and are formed in bilaterally symmetric in the vicinity to both ends of a pivotal axle (portion) a. Second projection portions c, c are formed on a base or housing H. Each of second projection portions c, c is formed of a pin shaped projection having an resiliency and slidably contacted with the corresponding one of truncated cone shaped portions b, b. At least two locations of pivotal axle (portion) a are grasped by means of a left and right pair of first projection portions d, d so as to be pivotably supported by means of first projection portions d, d (refer to FIG. 2). First projection portions d, d are constituted by an upper and lower pair of hook shaped projections formed on housing H.

Recessed portions e, e such as letter V shaped recessed surfaces are formed for pivotal axle portion a to be pivotably slid in the proximity to base portions of first projections d, d. A biasing device f is fixed to housing H. Biasing device f serves to slide pivotal axle portion a on recessed portions e, e. In FIG. 1, reference sign g denotes a lever portion such as a lock lever of the shift lock mechanism. Lever portion g is integrally or separately formed with or from pivotal axle portion a and is orthogonal to pivotal axle (portion) a. Lever portion g is pivoted in an X direction shown in FIG. 1 within a window hole or recessed portion W. However, this is an example. A rotational part such as a gear may be substituted for lever portion g. Hence, the movement of pivotal axle portion a is limited as follows: An axial direction (Y shown in FIG. 1) of pivotal axle portion a and a vertical direction thereof (Z shown in FIG. 1) are limited by means of truncated cone shaped portions b, b and second projection portions c, c. A forward-and-backward (longitudinal) movement (X shown in FIG. 1) of pivotal axle portion a is limited by means of biasing device f and recessed portions e, e. Thus, a clearance in the supporting portion of pivotal axle portion a is not developed. The clearance (or looseness) in the vertical direction (Z) may be limited by means of first projection portions d, d.

Figure 4:
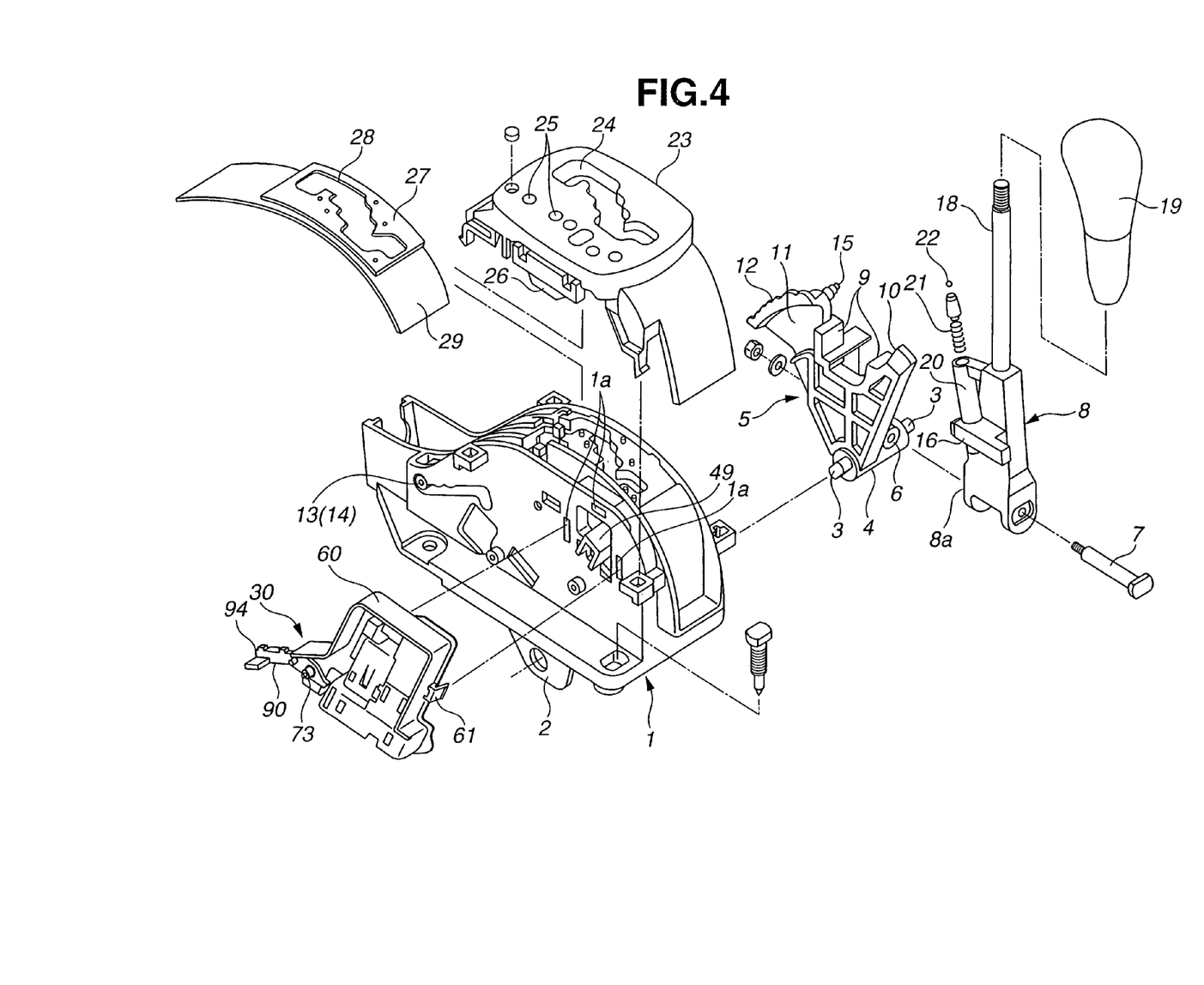
FIG. 4 is an exploded perspective view of a multi-stage automatic transmission operation device to which the clearance-free supporting structure for the pivotal axle according to the present invention is applicable.

An example of an application of the above-described principal structure to the shift lock unit of the multi-stage automatic transmission operation device is shown in FIG. 4. That is to say, as shown in FIG. 4, an axial supporting portion 2 orthogonal to a bottom portion of frame 1 made of a synthetic resin to fix frame 1 to a vehicle body so as to support axle portion 4 in parallel to the vehicle body left-and-right direction. In a select lever 5, a shaft 3 inserted through axle support portion 2 is formed on both end portions of axle portion 4. Select lever 5 is pivotably supported in the longitudinal direction of the vehicle body. An axle support portion 6 in parallel to the longitudinal direction of the vehicle body is integrally formed. A shift lever main body 8 is pivotably supported on axle support portion 6 in a lateral direction of the vehicle body via a shaft 7.

Select lever includes an engagement recess portion 9. Engagement recess portion 9 is constituted by a letter U shaped opening with which an engagement convex portion 16 disposed on a side surface of shift lever main body 8 is always engaged. A stop lever 10 projected toward the rear side of the vehicle body of engagement recess portion 9 is formed along an inner side surface of frame 1. A moderation (peripheral edge) lever 11 of a sector shape is integrally formed with the front side of the vehicle body engagement recess portion 9. A moderation portion (peripheral edge portion) 12 including a corrugated projection positioned on a circular locus with axle portion 4 as a center is installed.

Moderation portion 12 includes a plate spring 14 whose one end is supported on a shaft 13 and whose other end is bent circularly and brought in close contact with moderation portion 12. Shaft 13 is disposed in an inner surface of frame 1. Select lever 5 is made of a synthetic resin whose material is different from frame 1. A shaft 5 is projected from a rear surface of moderation lever 11 to be connected to a shift cable of automatic transmission. Shift lever main body 8 has a base portion 8a made of a synthetic resin through which a shaft 7 is penetrated. One side portion of base portion 8a is integrally formed or attached with an engagement convex portion 16 which is engaged with engagement recess portion 9 of select lever 5. Engagement convex portion 16 is a lateral straight line part projected laterally from the side surface of base portion 8a, both ends of engagement convex portion 16 being always engaged with engagement recess portion 9.

In addition, a metallic pipe 18 having a predetermined length is insert formed on base portion 8a. A knob 19 is coupled to an upper end portion of pipe 18. In addition, a cylindrical portion 20 having an upper opening is integrally formed on base portion 8a. A coil spring 21 and a ball or slide portion 22 are inserted into cylindrical portion.

Slide pin 22 is engaged with a slanted groove slanted toward the lateral direction and formed on a ceiling of frame 1. In addition, this slanted groove is formed in an arc shape in the longitudinal direction of the vehicle body with axle portion 4 as a center. This slanted groove is slanted to always bias shift lever main body 8 toward one of the forward-and-backward (longitudinal) directions, in this embodiment, toward the left side direction. It is noted that two cavities are formed on D and 3 positions so as to give a moderation feeling of the movement to an operator (driver) when the shift lever switches between D and 3 positions. Pipe 18 of shift lever main body 8 penetrates through a gate groove 24 of an indicator portion 23. It is noted that the indicator portion 23 is described in the United States Patent Application Publication No. US 2003/0074999 A1 (,the disclosure of which is herein incorporated by reference). This indicator 23 is provided with a gate groove 24 and a shift range display portion 25 such as P, R, N, D, 3, 2, and 1. A lamp house 26 to illuminate shift range display portion 25 is disposed in indicator portion 23. A reference numeral 27 denotes a guide plate through which a gate groove 28 is opened in analogy to gate groove 24. Guide plate 28 is fixed to a position of frame 1 having a predetermined height to guide the movement to guide the movement of pipe 19 penetrated through the movement of pipe 18 penetrated through gate groove 28. Pipe 18 is penetrated to cover spaces of gate grooves 24 and 28. A shutter plate 29 through which the height from lamp house 26 is installed on indicator portion 23 slidably in the longitudinal (forward-and-backward) direction. The above-described structure is substantially the same as described in the United States Patent Application Publication No. 2003/0074999 published on Apr. 24, 2003 (, the disclosure of which is herein incorporated by reference).

Figure 5:
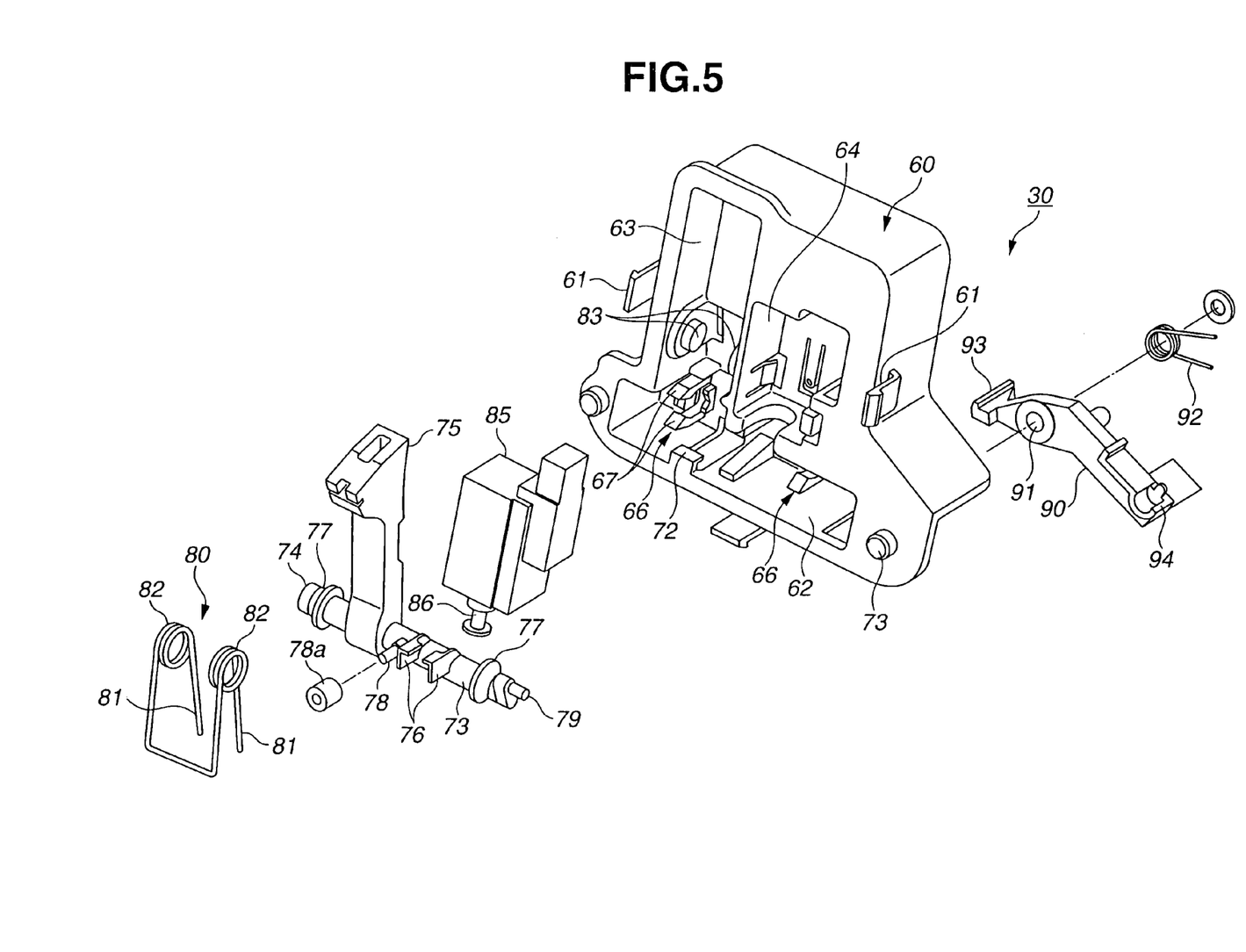
FIG. 5 is an exploded perspective view of a shift lock unit (mechanism) in the multi-stage automatic transmission operation device shown in FIG. 4.
Figure 6:
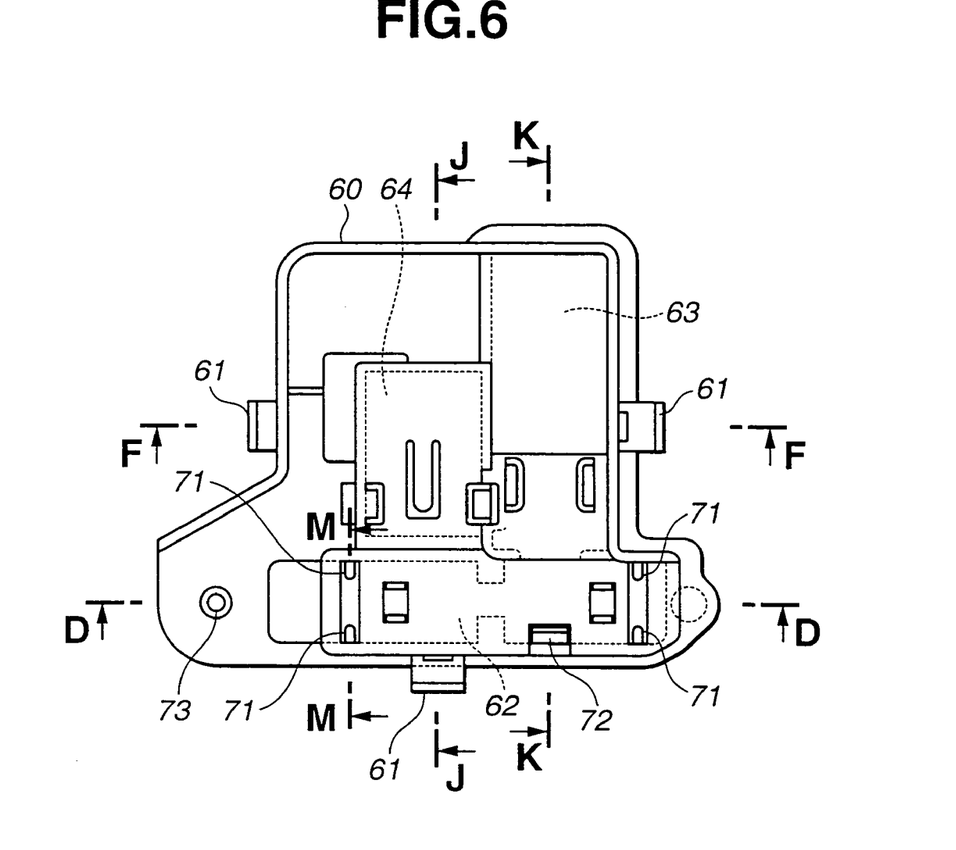
FIG. 6 is an elevational view representing a housing of the shift lock unit shown in FIG. 5.
Figure 7:
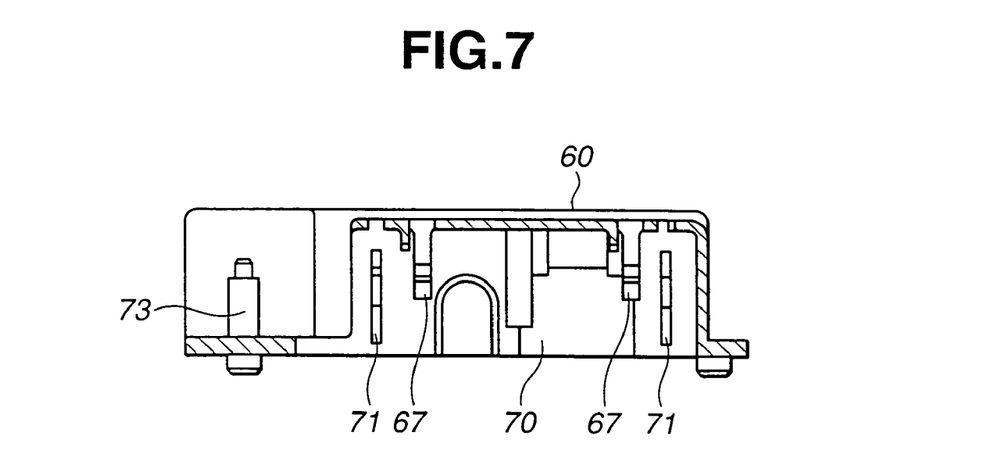
FIG. 7 is a cross sectional view cut away along a line D-D in FIG. 6.
Figure 8:
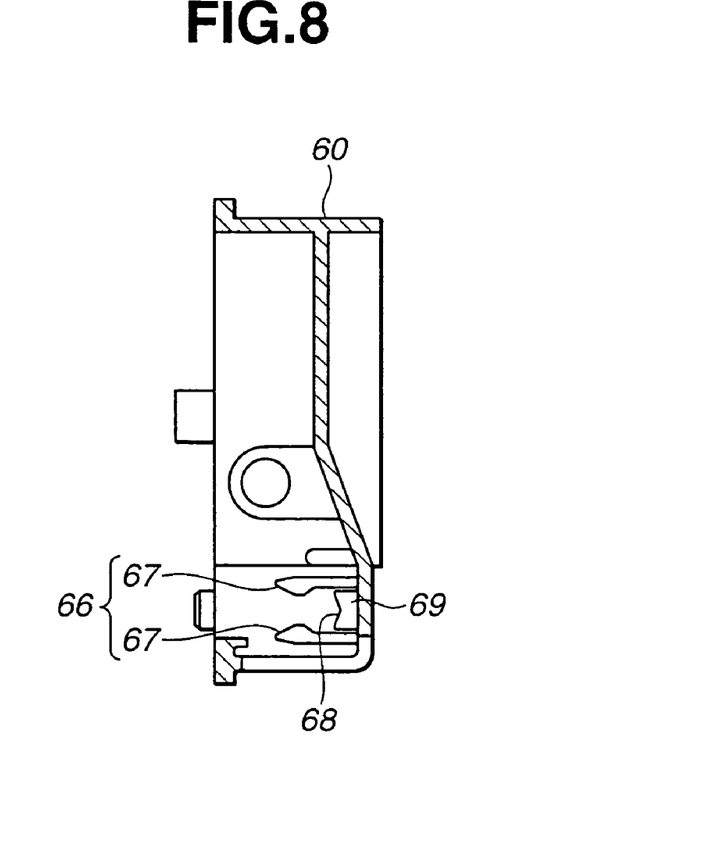
FIG. 8 is a cross sectional view cut away along a line J-J in FIG. 6.
Figure 9:
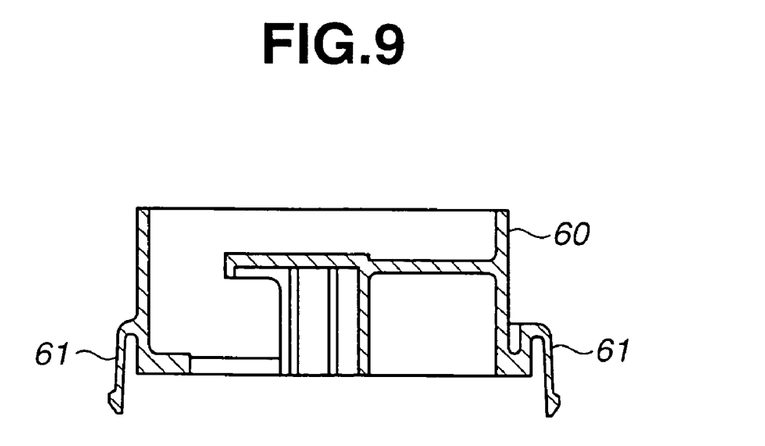
FIG. 9 is a cross sectional view cut away along a line F-F in FIG. 6.

Shift lock unit 30 is provided with at least three engagement projections 61, 61 projected from a bottom surface toward at least shaft 3 side. Engagement projections 61, 61 are engaged with at least three engagement recess portions 1a to make an easy assembly. Housing 60 is formed with an axle supporting recess portion 62 housing a pivotal axle portion 74, a housing recess 63 housing lock lever 75, and another housing recess 64 housing an actuator 85, respectively. Housing 60 is attached onto one side surface of frame 1 so that an open side of axle supporting recess portion 62 faces against a window hole 49.

Figure 10:
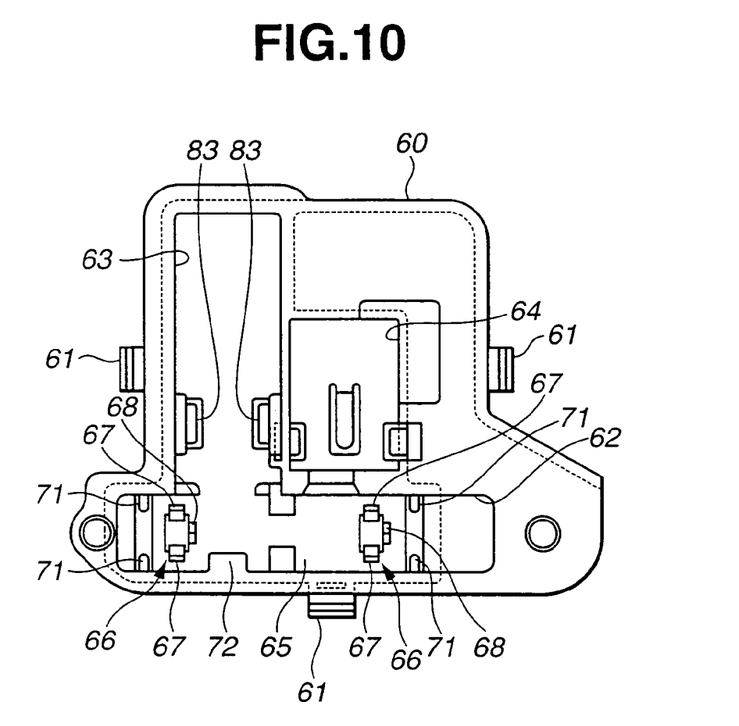
FIG. 10 is a rear view of the housing shown in FIG. 6.
Figure 11:
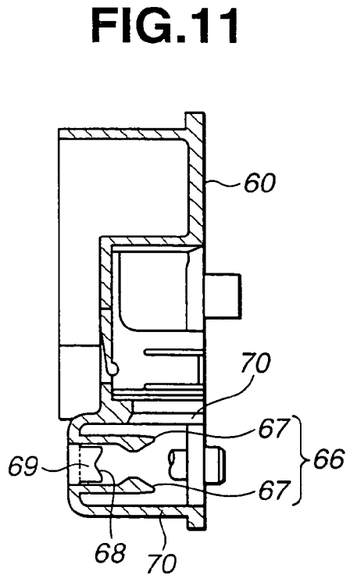
FIG. 11 is a cross sectional view cut away along a line K-K in FIG. 6.
Figure 12:
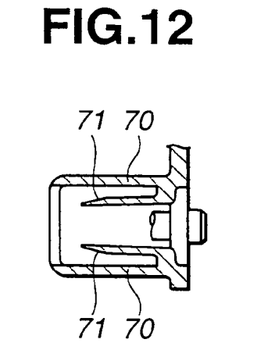
FIG. 12 is a cross sectional view cut away along a line M-M in FIG. 7.

As shown in FIG. 10, the axle supporting recess portion 62 is provided with a mutually spaced apart left-and-right pair of graspable projection portions 66, 66 having substantially letter U shapes and constituted by a pair of hook shaped projections. Each graspable projection portion 66 has a pair of hook shaped projections projected vertically from an inner bottom portion 65 of axle supporting recess portion 62. A pair of hook portions 67 and 67 at tip portions of each graspable projection portion 66 is wide operable and has a resiliency that pivotal axle portion 74 can be grasped.

In addition, as shown in FIGS. 6 through 12, projections 69, 69 are formed which form slidably contact recesses 68, 68 in the vicinity to one side of graspable projections 66, 66. In addition, a pair of slidably contactable projections 71, 71 (first projection portions) are formed at positions outside graspable projection 66 and projection 69 and are constituted by pin shaped projections. An engagement portion 72 is formed which fixes a biasing device 80 on an inner side wall 70 located at a bottom side of axle supporting recess portion 62.

As shown in FIG. 5, pivotal axle portion 74 is formed with truncated cone shaped portions 77, 77 in the vicinity to both ends of pivotal axle portion 74. Each truncated cone shaped portion 77, 77 is slidably contacted with a corresponding slidable contact projection 71, 71. Its truncated cone shaped surface thereof 77, 77 is faced toward its outside of pivotal axle supporting portion 74 and the truncated cone shaped portion 77, 77 are symmetrical to each other in the lateral direction (in the axial direction of the pivotal axle portion 74). A lock lever 75, an actuator engagement portion 76, and a rotation limitation stopper 78 are formed between the truncated cone shaped portions 77, 77. Actuator engagement portion 76 has a flat head portion to receive a flat head screw shaped plunger 86 of actuator 85 so that the pivotal axle portion 74 is easily coupled to actuator 85. A rubber ring 78a is attached onto rotation limitation stopper 78. One end portion of pivotal axle portion 74 is provided with an eccentric projection 79.

This pivotal axle portion 74 is pivotally supported on graspable projections (second projections) 66, 66 by inserting an axle portion thereof into projections 67, 67 of housing 60. When the axle portion thereof is inserted into hook projection portions 67, 67 and biasing device 80 is used to push it into hook projection portions 67, 67, the pivotal axle portion 74 is pivotally slid on the slide contact recess portions 68, 68. It is noted that projection 79 of pivotal axle portion 74 is axially supported on housing 60 so as to be enabled to be separated from one end portion of a release lever 90. Release lever 90 has an axle hole 91 so as to be pivotably supported on housing 60 by means of an axle 73 and is biased by means of a spring 92 so that one end portion 93 of release lever 90 is always spaced apart from eccentric projection 79. The other end portion 94 of release lever 90 is contacted with a lower end portion of a pin 46 whose upper end portion is exposed to indicator portion 23. It is noted that pin 46 is disclosed in a U.S. Patent Application Publication No. US 2003/0074999 A1 published on Apr. 24, 2003 (, the disclosure of which is herein incorporated by reference).

Biasing device 80 is formed with integrally coupled torsion springs and has end portions 81, 81 which are slidably contacted with a peripheral surface of pivotal axle portion 74 and both ends thereof are spaced apart from each other. Circular projections 83, 83 are formed on housing recess portion 63 to engage windings 82, 82 of biasing device 80.

In the park lock state, suppose that shift lever main body 8 is tried to be forcibly shifted to R position or N position. At this time, since a side surface of stopper lever 10 of main body 8 located toward the rear side is brought in close contact with the side surface of lock lever 75 located at the front side of the vehicle body, lock lever 75 is pressed toward the rear side of the vehicle body. Hence, since lock lever 75 is contacted with an inner side surface of window hole 49 located at the vehicle rear side. Its impulsive weight of load can be loaded on frame 1.

Next, when, in the park lock state, a vehicular engine is started to travel the vehicle and a brake pedal is depressed, a power is supplied to actuator 85 so that its plunger 86 is lifted in a straight movement. At this time, actuator engagement portion 76 is pivoted in an upward direction through a predetermined angle and the pivotal axle portion 74 is pivoted. At this time, lock lever 75 is slanted toward an outside of frame 1 so as to enable the movement of stop lever 10. Hence, with knob 19 grasped, pipe 18 can be moved on gate groove 24 from P position. With lever position shifted to R position, the vehicular backward motion can be achieved. Or with lever position shifted to D position, the vehicle can be forwarded.

From this state, when shift lever main body 8 is shifted toward the left direction of the vehicle body, the shift lever main body 8 can be shifted to 3 (third range) position. Thus, the engagement convex portion 16 of shift lever main body 8 is moved in the left-and-right directions but is not disengaged from engagement recess portion 9 of select lever 5. Shift lever main body 8 and select lever 5 are always pivoted integrally for the forward-and-backward directions. It is noted that, in a case where a manual shift groove is installed outside of gate groove 24 of D position, shift lever main body 8 is disengaged from select lever 5 so as to be shifted in the forward-and-backward directions. Hence, a manual sense of driving may be achieved.

When such a shift operation as described above is carried out, the peripheral edge (moderation lever) 11 of select lever 5 is pivoted. Hence, a rounded other end of plate spring 14 slides on moderation portion 12 so that a moderation sense occurs to a vehicle driver. In addition, when the shift lever main body 8 is shifted in the left-and-right directions, slide pin 22 biased by means of coil spring 21 slides the slanted groove formed on the ceiling of frame 1. At this time, shift lever 8 is acted to approach to the left side of the vehicle body so as to request the driver to operate the shift lever to move toward the right side of the vehicle body during a shift change. It is noted that the detailed structure of plate spring 14 is described in the United States Patent Application Publication No. US 2003/0074999 A1 (, the disclosure of which is herein incorporated by reference).

On the other hand, in a state wherein the vehicle is traveling at a speed equal to or above a constant speed, actuator 85 does not operate and its plunger 86 is projected by means of a spring force of a built-in spring. Then, when actuator engagement portion 76 is pivoted in the upward direction through the predetermined angle with the axle of pivotal axle portion as the center, lock lever 75 is slanted in an inner side of frame 1 from window hole 49 so as to block the movement of stop lever 10. That is to say, the side surface of stop lever 10 located at the front side of the vehicle body is contactable with the side surface of lock lever 75 located at the rear side of the vehicle body. Thus, such an N (Neutral) lock of R inhibit that the shift lever main body 8 cannot be shifted to R and P positions is carried out. Hence, if shift lever main body 8 is tried to be shifted from N position to R position, the shift operation cannot be achieved. If the shift operation is forcibly carried out, the side surface of stop lever 10 located at the front side of the vehicle body is contacted with the side surface of lock lever 75 located at the rear side of the vehicle body so that lock lever 75 is pressed toward the front side of the vehicle body. Then, lock lever 75 is contacted with an inner surface of window hole 49 located at the front side of the vehicle body. Then, its impulsive weight load can be loaded on frame 1.

As described above, lock lever 75 is projected toward the inner portion of frame 1 when the vehicle traveling is stopped and parked so that the park lock of the shift lever is carried out. In addition, when the vehicle is traveling at a speed equal to or above a constant speed, lock lever 75 is projected toward the inner portion of frame 1 so that R inhibit N lock of shift lever (8) is carried out.

In these cases, when pivotal axle portion 74 is revolved, the movements in the axial direction and vertical direction of pivotal axle (portion) 74 are limited by means of truncated cone shaped portions 77, 77 and slide contactable projections 71, 71 and the movement of the forward-and-backward (longitudinal) direction thereof is limited by means of biasing device 80 and slide contactable recess portions 68, 68. Hence, during the operation of pivotal axle portion 74, there is no possibility that the clearance is developed between pivotal axle (portion) 74 and its supporting portions. Hence, an abnormal sound during the operation of pivotal axle portion 74 can be prevented from occurring. It is noted that the lever portion includes lock lever 75 of the operation device of the multi-stage automatic transmission, the operation device of the multi-stage automatic transmission comprising: frame 1 to be fixed to a vehicle body; and shift lever 18, 19 supported so as to enable a shift in both of longitudinal and lateral directions of the vehicle body, the multi-stage automatic transmission being capable of carrying out a park lock when the shift lever is placed at the P position and the R inhibit when the shift lever having an axle portion in parallel to the lateral direction of the vehicle body on which select lever 5 is disposed, shift lever main body 8 integrated to the axle portion and being disposed on another axle portion which is parallel to the longitudinal direction of the vehicle body, the select lever having engagement recess portion 9 which is always enabled to be engaged with an engagement convex portion 16 disposed on a side surface of the shift lever main body and having stop (or stopper) lever 10 projected along the side wall of the frame, the front side of the vehicle body of the stop lever and the rear side of the vehicle body thereof being disposed to be contacted with lock lever 75 which is advanced or retracted toward an inner side or toward an outer side from a window hole 49 disposed on a side surface of the frame, actuator 85 to pivot the lock lever toward an inner side of the frame to contact with the stop lever to lock the lock lever when the shift lever is placed at the P position or the N position being fixed to an outside surface of the frame and the weight acted upon the lock lever receiving the inside surface of the window hole.

The entire contents of a Japanese Patent Application No. 2003-357500 (filed in Japan on Oct. 17, 2003) are herein incorporated by reference. The scope of the invention is defined with reference to the following claims.

What is claimed is:

1. A clearance-free supporting structure for a pivotal axle, comprising:
   a housing;
   at least one pair of first projections formed on the housing between which the pivotal axle is inserted to enable a pivotal movement of the pivotal axle;
   a pair of left and right truncated cone shaped portions formed on the pivotal axle;
   at least one pair of second projections formed on the housing that graspably contacts the pair of left and right truncated cone shaped portions and that enables the pivotal movement of the pivotal axle;
   at least one recessed portion formed on the housing at a position placed in proximity to a base portion of each of the pair of first projections to enable a slidable contact thereof with the pivotal axle; and
   a biasing device to bias the pivotal axle to be pressed toward the recessed portion, the pair of first projections, the pair of left and right truncated cone shaped portions, the pair of second projections, the recessed portion, and the biasing device supporting the pivotal axle on the housing while limiting any directional movements of the pivotal axle other than the pivotal movement of the pivotal axle.

2. A clearance-free supporting structure for a pivotal axle as claimed in claim 1, wherein the pair of first projections comprises mutually spaced apart two pairs of first projections between each of the two pairs of which the pivotal axle is inserted, the two pairs of first projection limiting a vertical direction movement of the pivotal axle.

3. A clearance-free supporting structure for a pivotal axle as claimed in claim 2, wherein the recessed portion comprises a pair of recessed portions which are placed in the proximities to the base portions of the respective two pairs of first projections, both of the pair of second projections and the pair of recessed portions serving to limit an axial direction movement of the pivotal axle and the vertical direction movement thereof.

4. A clearance-free supporting structure for a pivotal axle as claimed in claim 3, wherein both of the biasing device and the pair of recessed portions serve to limit a longitudinal direction movement of the pivotal axle orthogonal to the axial direction movement thereof.

5. A clearance-free supporting structure for a pivotal axle as claimed in claim 1, wherein the biasing device comprises a pair of torsion springs integrated together, the integrated portion being fixed to the housing and a free end portion of each torsion spring being contacted with the pivotal axle.

6. A clearance-free supporting structure for a pivotal axle as claimed in claim 1, wherein a lever portion orthogonal to the pivotal axle is integrated to the pivotal axle.

7. A clearance-free supporting structure for a pivotal axle as claimed in claim 6, wherein the lever portion comprises a lock lever of an operation device of a multi-stage automatic transmission having functions of park lock at a P position and an R inhibit at an N position and wherein the housing is a housing of a shift lock unit having an axle supporting recess portion to house the pivotal axle therein, a first housing recess portion to house the lock lever therein, and a second housing recess portion to house an actuator therein, the housing being attached onto a side surface of a frame so as to face against a window hole of the frame.

8. A clearance-free supporting structure for a pivotal axle as claimed in claim 7, wherein the axle supporting recess portion is provided with two pairs of left and right first projections of mutually spaced apart hook shapes at an inner bottom portion of the housing, each having a substantially letter U-shaped body and a tip of each of the two pairs of first projections having widely openable resilient hook portions for grasping the pivotal axle.

9. A clearance-free supporting structure for a pivotal axle as claimed in claim 8, wherein in a proximity to one side of the two pairs of first projections, third projections on which the pair of recess portions are formed are projected from the inner bottom portion of the axle supporting recess portion, pin shaped projections constituting the pair of second projections are formed on vertical inner side walls at positions outside of each of the two pairs of first projections and the third projections, and an engagement portion to fix the biasing device is formed on a lower inner side wall.

10. A clearance-free supporting structure for a pivotal axle as claimed in claim 9, wherein the pair of left and right truncated cone shaped portions on which the pin shaped projections are slid are formed symmetrically in an axial direction of the pivotal axle with truncated cone shaped surfaces of the pair of left and right truncated cone shaped portions faced outside of the pivotal axle and the lock lever, actuator engagement portion, and a rotation limitation stopper are formed between the pair of left and right truncated cone shaped portions.

11. A clearance-free supporting structure for a pivotal axle as claimed in claim 10, wherein the biasing device comprises two torsion springs integrated to each other and having spaced apart two free end portions slidably contacted on a peripheral surface of the pivotal axle and winding portions which are engaged with circular projections formed on the first housing recess portion of the housing.

12. A clearance-free supporting structure for a pivotal axle as claimed in claim 6, wherein the lever portion comprises a lock lever of an operation device of a multi-stage automatic transmission, the operation device of the multi-stage automatic transmission comprising: a frame to be fixed to a vehicle body; and a shift lever supported so as to enable a shift in both of longitudinal and lateral directions of the vehicle body, the multi-stage automatic transmission being capable of carrying out a park lock when the shift lever is placed at a P position and an R inhibit when the shift lever has an axle portion in parallel to the lateral direction of the vehicle body on which a select lever is disposed, a shift lever main body integrated to the axle portion and being disposed on another axle portion which is parallel to the longitudinal direction of the vehicle body, the select lever having an engagement recess portion which is always enabled to be engaged with an engagement convex portion disposed on a side surface of the shift lever main body and having a stop lever projected along a side wall of the frame, a front side of the vehicle body of the stop lever and a rear side of the vehicle body thereof being disposed to be contacted with the lock lever which is advanced or retracted toward an inner side or toward an outer side from a window hole disposed on a side surface of the frame, an actuator to pivot the lock lever toward an inner side of the frame to contact with the stop lever to lock the lock lever when the shift lever is placed at the P position or the N position being fixed to an outside surface of the frame.

* * * * *